United States Patent

Schmidt et al.

[11] Patent Number: 5,830,096
[45] Date of Patent: Nov. 3, 1998

[54] BICYCLE AND A BICYCLE HAVING A BICYCLE POWER TRAIN

[75] Inventors: Frank Schmidt, Scheweinfurt; Holger Brandt, Grafenrheinfeld; Markus Krumbeck; Andreas Neuer, both of Schweinfurt, all of Germany

[73] Assignee: Fichtel & Sachs AG, Schweinfurt, Germany

[21] Appl. No.: 805,078

[22] Filed: Feb. 21, 1997

[30] Foreign Application Priority Data

Feb. 23, 1996 [DE] Germany ............... 196 06 667.0

[51] Int. Cl.$^6$ .................................................. F16H 55/30
[52] U.S. Cl. ........................................ 474/156; 474/160
[58] Field of Search .............................. 474/152, 156, 474/158, 160

[56] References Cited

U.S. PATENT DOCUMENTS

| | | | |
|---|---|---|---|
| 4,016,772 | 4/1977 | Clemens et al. | 474/156 |
| 4,116,081 | 9/1978 | Luttrell et al. | 474/156 |
| 4,889,521 | 12/1989 | Nagano | 474/164 |
| 5,123,878 | 6/1992 | Nagano | 474/160 |
| 5,133,695 | 7/1992 | Kobayashi | 474/160 |
| 5,437,582 | 8/1995 | Romano | 474/156 |

FOREIGN PATENT DOCUMENTS

| | | |
|---|---|---|
| 0021839 | 1/1981 | European Pat. Off. . |
| 0474139 | 3/1992 | European Pat. Off. . |
| 0479032 | 4/1992 | European Pat. Off. . |
| 0538780 | 4/1993 | European Pat. Off. . |
| 3936921 | 5/1990 | Germany . |
| 4330989 | 3/1995 | Germany . |

*Primary Examiner*—Thomas R. Hannon
*Attorney, Agent, or Firm*—Nils H. Ljungman and Associates

[57] ABSTRACT

A bicycle power train for bicycles, the bicycle power train including a driving sprocket set and a driven sprocket set. A chain connects the driving sprocket set and the driven sprocket set to one another. The chain transfers torque from a sprocket of the driving sprocket set to a sprocket of the driven sprocket set. The torque is transferred to the chain from the driving sprocket via drive teeth disposed on the driving sprocket. The drive teeth each include a drive flank that engages a corresponding link roller of the chain. Each drive flank has a bevel formed thereon, the bevel being shaped to compensate for the lengthening of the chain with wear. The bevel is configured to maximize the number of drive teeth that can simultaneously engage the chain and participate in the transfer of torque over the life of the chain.

20 Claims, 5 Drawing Sheets

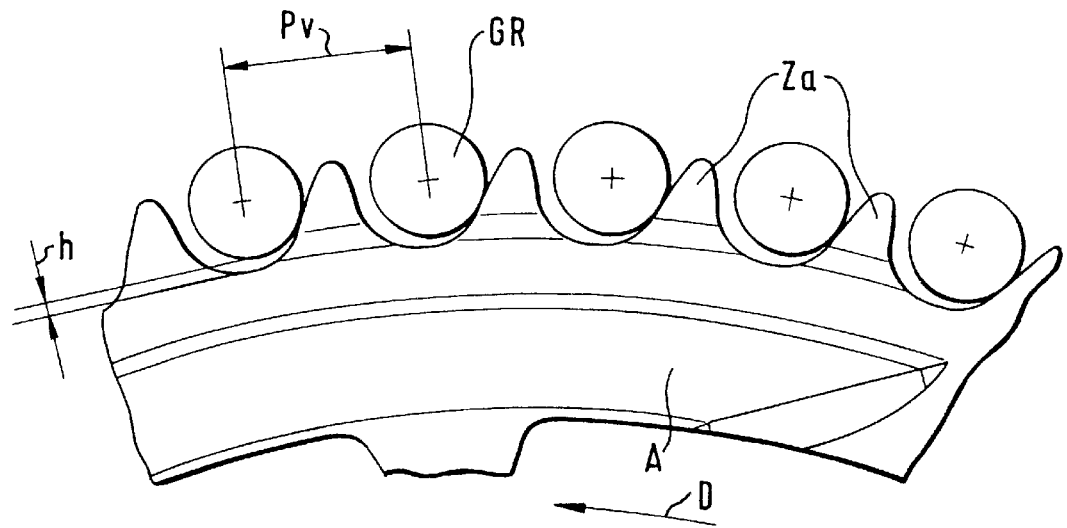
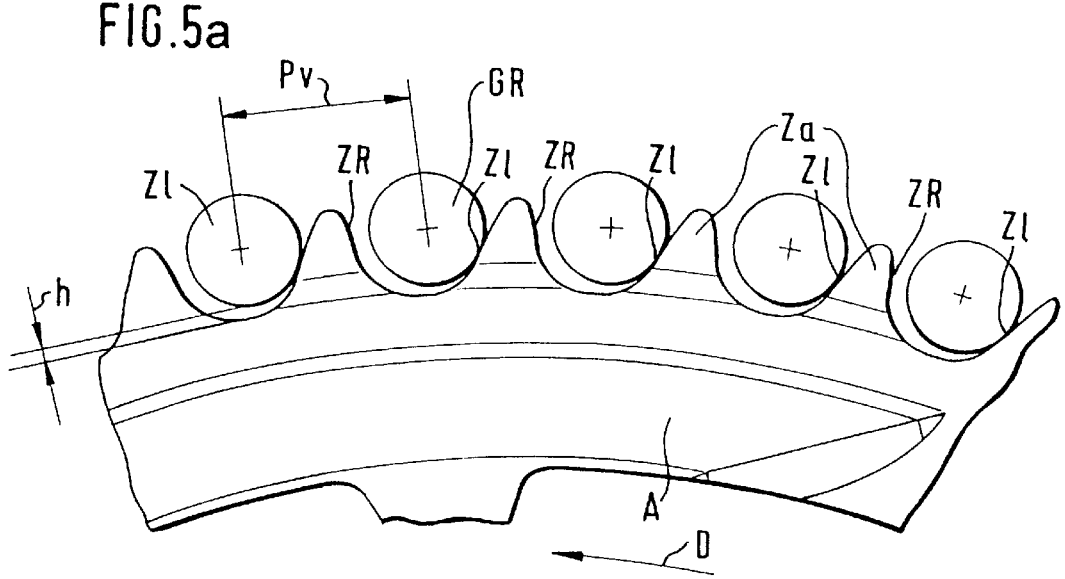

BICYCLE AND A BICYCLE HAVING A BICYCLE POWER TRAIN

BACKGROUND OF THE INVENTION

1. Field of the Invention

The present invention relates generally to a bicycle and a bicycle having a bicycle power train. The bicycle power train can include a driving or front sprocket set, and a driven or rear sprocket set. A chain can connect the front and rear sprocket sets to one another. The chain preferably includes chain links, which chain links can include link rollers and side plates. To shift or transfer the chain to another sprocket of the front sprocket set, a derailleur can be located in an inlet area of the chain. The derailleur can impart movements in a direction parallel to a pedal axis of the front sprocket set. Each of the sprockets of the front sprocket set can include a plurality of teeth. The teeth of a corresponding sprocket can be connected to one another by tooth spaces, the tooth space preferably having osculating radii or radii of curvature.

2. Background Information

A known bicycle power train having a driving, or front, sprocket set and a driven, or rear, sprocket set is described in U.S. Pat. No. 5,133,695, where the teeth of the sprockets of the driving sprocket set have an asymmetrical shape, to counteract a "chain jamming phenomenon" which occurs when the chain is to be shifted from the larger sprocket to the smaller sprocket. This chain jamming occurs when the chain is being shifted under a load, and when there is a specified position of the teeth of the smaller sprocket in relation to the teeth of the larger sprocket, that is, when there is a distance between the engaged teeth in question which is greater than a whole-number multiple of the chain pitch. The chain jams as a result of the additional amplifying forces which occur at the point on the larger sprocket where the chain has a tendency to depart from the tooth row.

If, to eliminate the disadvantages described above, the chain play or clearance or slack between the teeth is increased, one result is that the chain jumps prematurely from the larger sprocket to the smaller sprocket. One way to solve this problem is to make modifications to the tooth profile, which tooth profile becomes asymmetrical, so that the driving tooth flank of the teeth remains essentially constant. A convex guide profile is located in the vicinity of the tooth peaks, and the second opposite tooth flank, however, has a bevel which emerges into the tooth head even ahead of the center of the tooth.

The tooth, which thereby becomes slimmer, meets the requirements for the elimination of the "chain jamming phenomenon", but exacerbates another problem which has to do with the wear of the chain. Regardless of the load, only two or a maximum of only three teeth participate in the transmission of the torque, while the great majority of the remaining teeth perform only a guide function for the chain. The newer the chain and the more exactly the pitch of the chain matches the distribution, or pitch, of the teeth on the sprocket in question, the more teeth participate in the transmission of the torque. The specific forces involved are therefore particularly great, as is the wear, which increases even more as the lubrication decreases.

The reasons indicated above are also the basis of U.S. Pat. No. 5,123,878, where a beveling of the flanks which are not participating in the transmission of the torque is also proposed to eliminate the "chain jamming phenomenon". Here again, the problem that the torque is being transmitted only by a small number of teeth is not solved, as a result of which the suggestion has been made to bring more than three teeth into a force-transmitting connection with the individual link rollers of the chain, which is undoubtedly possible only by the modification of the tooth flank which participates in the transmission of the torque. This modification consists of a beveling of this tooth flank along a line which is tangent to the osculating radius in the tooth base, which allows the link rollers to be displaced out of the tooth base and to transmit torque even or already in the vicinity of the chain run-in, before the link rollers have dropped into the osculating radii of the individual tooth spaces. In this manner, more teeth can participate in the transmission of forces not only during the shifting process, but also during regular operation.

OBJECT OF THE INVENTION

The object of the present invention is therefore to find a shape for a driving tooth flank of teeth on sprockets of a driving sprocket set which makes it possible, when the link rollers of a chain are under load, for more than the currently only two or three teeth to concurrently participate in the transmission of torque between the sprockets and the link rollers of the chain.

SUMMARY OF THE INVENTION

The present invention teaches that this object can be accomplished by having all, or some, of the teeth of a sprocket or sprockets of a driving sprocket set have an asymmetrical shape when viewed axially. The asymmetrical shape can be a result of a bevel. The bevel can replace a tooth flank on the side of the tooth which side, when the sprocket of the driving sprocket set is driven by the bicyclist, can enter into a driving contact with the link rollers of the chain.

In other words, all, or some, of the teeth of a sprocket or sprockets of a driving sprocket set can have an asymmetrical shape when viewed along the axis of rotation of the corresponding sprocket. A corresponding asymmetric tooth preferably includes two flank portions disposed on opposite sides of the tooth from one another. The leading flank portion can lead, or precede, the remainder of the tooth in the normal forward driving direction of rotation of the sprocket, and the trailing flank portion can trail, or follow, the remainder of the tooth in the normal forward driving rotation. Between the asymmetric tooth and the adjacent preceding tooth (which adjacent preceding tooth can also be formed to be an asymmetric tooth in accordance with the present invention), there can be a tooth space for engaging a corresponding link roller of the chain; the leading flank portion of the asymmetric tooth and the adjacent trailing flank portion of the preceding tooth can form a portion of a tooth space to engage a link roller of the bicycle chain.

The leading flank portion can engage, or bear against, the corresponding link roller to preferably form a drive flank to transmit torque from the driving sprocket to the chain. The trailing flank portion can be thought of as an idle flank, because the trailing flank portion essentially does not participate in the transfer of torque between the driving sprocket and the chain. The drive flank and the idle flank can be located on opposite sides of the tooth with respect to the normal direction of rotation, and the idle flank can essentially not be involved in the propulsion of the bicycle.

To permit preferably more than two or three teeth of a sprocket to participate in the transfer of torque between the sprocket and the chain, the present invention teaches that the drive flank of the tooth can be configured differently than the idle flank of the tooth, creating for one possible embodiment of the present invention, an asymmetrical tooth profile. For the driving sprocket, the known leading tooth flank that can interact in the driving direction of rotation with the link roller of the chain for purposes of torque transmission can be replaced by a bevel as taught by the present invention. The bevel can enter substantially tangentially into the osculating radius, or radius of curvature, of the adjacent tooth space at a point of transition between the leading flank portion and the tooth space. The connection of the location of the transition with the starting point of the osculating radius can form an angle with a ray, or straight line. The ray, or straight line, can begin essentially at the center of the sprocket. The angle formed can preferably be at least 60 degrees, and can give the bevel a direction so that the bevel can emerge, or intersect, or can end, preferably at the radially upper end of the tooth, beyond the tooth center.

The present invention also teaches that the bevel can be formed so that a cross-section or profile of the bevel forms a substantially straight line or, in a possible alternative embodiment of the present invention, forms a circular arc portion having a radius of curvature. The radius of curvature of the circular arc portion can preferably have the magnitude of at least four times the chain pitch or distance between the link rollers of the chain. The tooth can have a radial height, which radial height preferably is not significantly modified by the introduction of the bevel. The trailing tooth flank opposite the bevel can remain unchanged or substantially unchanged from a known tooth.

In other possible embodiments of the present invention, the profile of the bevel can be formed other than by a straight line or the circular arc portion having a radius of curvature as described above. For example, testing with chains having different states of wear could experimentally determine that some other bevel profile, as for example a bevel having a non-constant radius of curvature could be used for a particular chain/sprocket combination. Or the chain/sprocket system could be mathematically modelled, with the bevel profile satisfying some relatively more complex mathematical function or disposed to substantially form a curve through a number of discrete points calculated along the profile. The bevel can compensate for the wear of the chain, and the bevel can have a profile or shape that can be chosen or determined to essentially optimize compensation for wear of the chain throughout the working life of the chain.

In yet other possible embodiments of the present invention, the teeth that are made in accordance with the present invention can be made symmetrical about the radial centerline of each tooth. The drive flank of each such tooth can have a bevel in accordance with the teachings of the present invention, but the idle flank can be made symmetrical, or substantially symmetrical, with the drive flank of the tooth with respect to the radial centerline of the tooth.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The improvement of the transmission of torque between the sprockets and the chain taught by the invention is explained below in greater detail, with reference to the accompanying drawings, in which:

FIG. 5 shows a sprocket with link rollers of a chain, where the distance between the link rollers does not coincide with the distance between the teeth of the sprocket; and FIG. 5a is similar to FIG. 5 and includes additional reference characters.

DESCRIPTION OF THE PREFERRED EMBODIMENT

Figure 1:
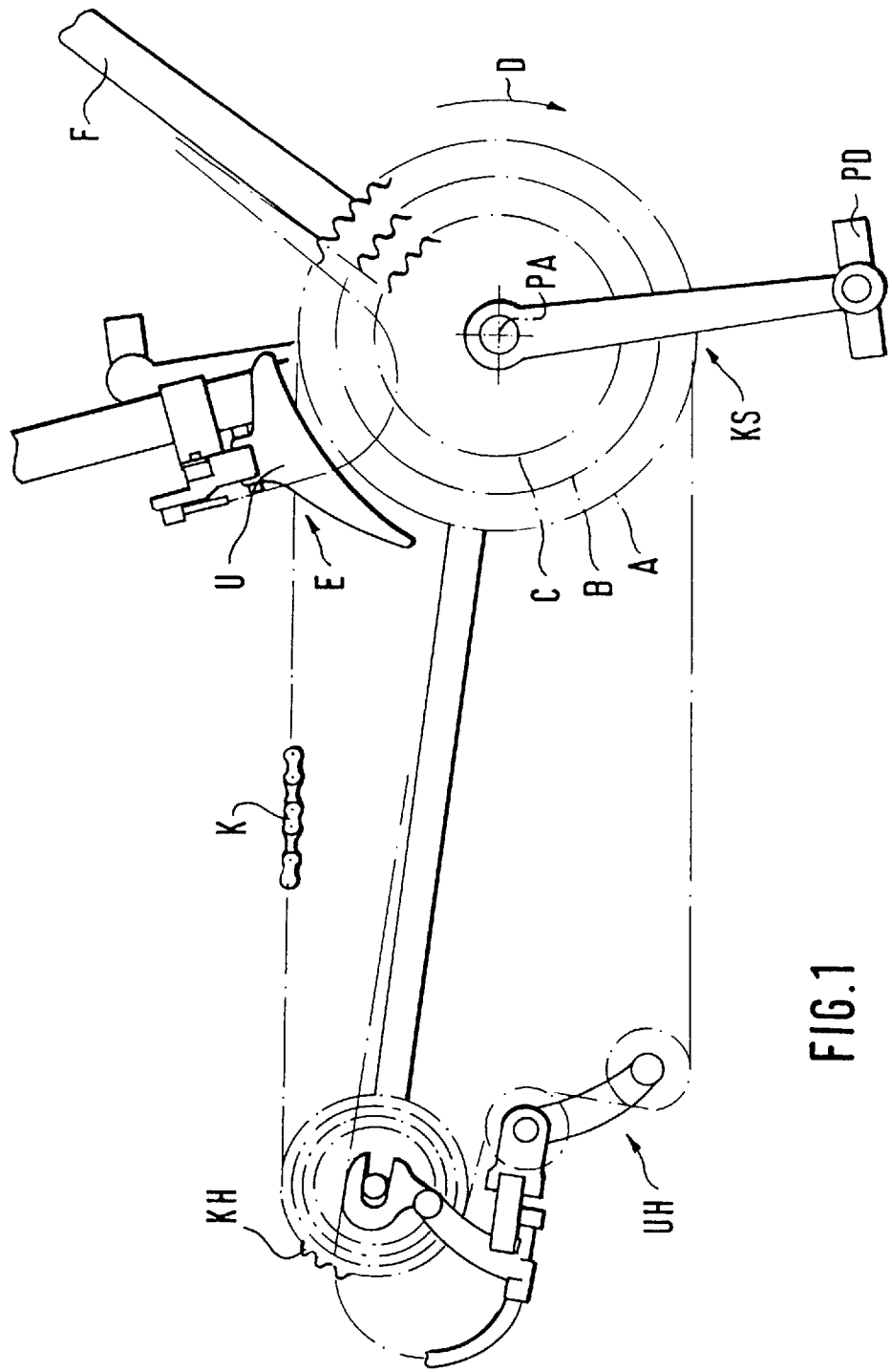
FIG. 1 shows a bicycle power train which has a driving sprocket set and a driven sprocket set, and a chain which can be transferred from one sprocket to another by a derailleur.

FIG. 1 describes a bicycle power train which can be installed on a bicycle frame F of a bicycle. The bicycle power train can include a driving or front sprocket set KS, a driven or rear sprocket set KH, a chain K with chain links KG (see FIG. 2), a derailleur U to shift the chain K on the driving sprocket set KS, and a rear derailleur UH to shift the chain K on the driven sprocket set KH. The driving sprocket set KS can include at least two sprockets, a larger sprocket A and a smaller sprocket B. In practice, there are generally three coaxial sprockets A, B and C next to one another. The driving sprocket set KS can be rotated by the bicycle rider by the application of a force to a pedal PD, and the pedal PD can rotate with the sprockets A, B around a pedal axis PA in a direction of rotation D. As a result of the rotation the chain K, by means of the derailleur U, can be shifted preferably in an inlet area E onto one of the sprockets, the larger sprocket A and the smaller sprocket B, or onto the third, even smaller sprocket C, and can drive the driven sprocket set KH.

Figure 2:
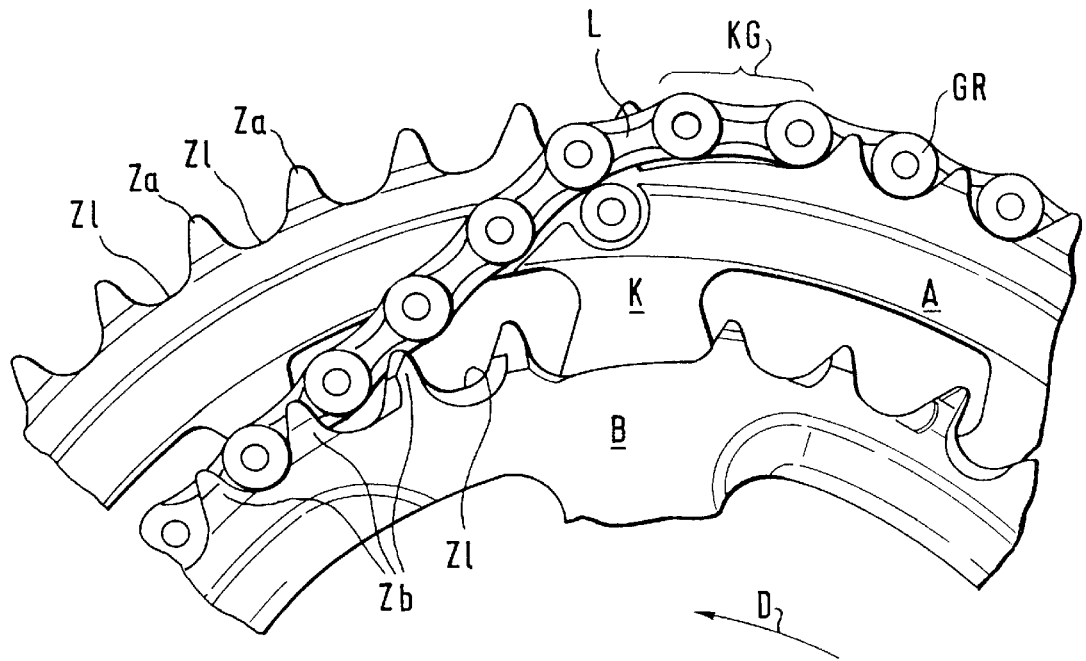
FIG. 2 shows a segment of the driving sprocket set with the chain in the shifting position, with teeth which are beveled on the drive flank.

As shown in FIG. 2, on the outer periphery of the sprocket A there can be teeth Za, between which teeth Za there can be tooth spaces ZI. Likewise, on the periphery of the sprocket B there can be teeth Zb, between which teeth Zb there can be tooth spaces ZI. The chain K is preferably in the transfer position from the smaller sprocket B to the larger sprocket A. This chain K can be divided in the longitudinal direction by link rollers GR, and the teeth Za and Zb can be engageable between the link rollers GR of the chain K.

FIG. 2 also shows that the chain K can include chain links KG with side plates L.

Figure 4:
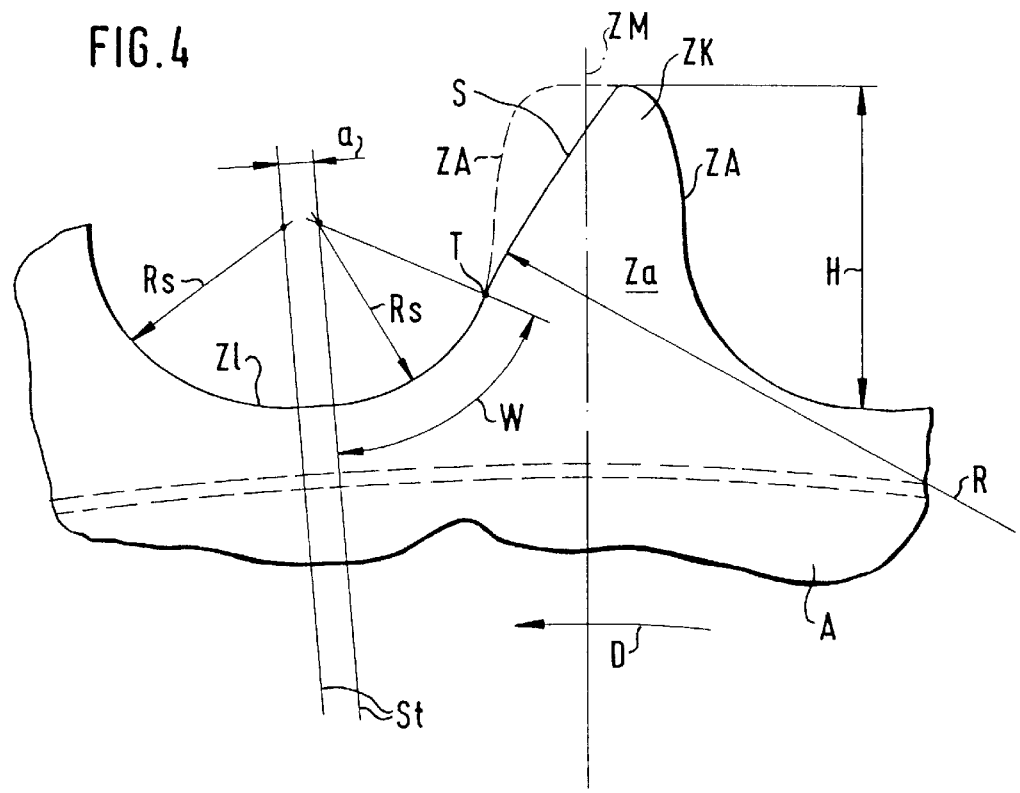
FIG. 4 illustrates the shape of a tooth with the beveled driving tooth flank, compared to the conventional tooth flank.

FIG. 4 shows the measures that can be taken to preferably have more than the conventional two or three link rollers GR participate in the transmission of torque between the sprocket A or B and the link rollers GR of the chain K. The tooth space ZI, as before, can include two osculating radii Rs, the starting points of which two osculating radii Rs can be at a distance "a" from one another. This distance "a" can leave sufficient clearance for the link roller GR. For the tooth Za or Zb, the known sprocket set indicates the use of symmetrical, or substantially symmetrical tooth flanks ZA with respect to a tooth center ZM. The same is essentially true for a tooth flank ZB of the tooth Zb on the smaller sprocket B, where the tooth flanks ZB need not necessarily coincide with the tooth flanks ZA.

By way of analogy, however, it is sufficient to speak only of the tooth flank ZA for the sprocket A in the remainder of the current description.

In other words, although reference below will be made and illustrated with respect to the sprocket A, it can be appreciated that the features of the present invention can be applied with respect to any of the sprockets of the front or driving sprocket set KS, and can be realized on one or more teeth of the plurality of teeth of the corresponding sprocket A, B, C and so on of a particular embodiment of the driving sprocket set KS.

In other words, in a possible embodiment of the present invention, the tooth space ZI can be a portion of the sprocket A between or adjacent the opposing flanks ZA of the two corresponding adjacent teeth Za of the sprocket A. These adjacent flanks ZA are shown on the left side of the tooth space ZI and on the right side of the tooth space ZI as viewed in FIG. 4. For each of the known teeth Za, the tooth flanks ZA of each known tooth Za can be substantially symmetrical about the radial centerline ZM of the known tooth Za. A portion of this known tooth flank ZA can be realized as indicated by the dotted lines in FIG. 4 for the right side tooth flank ZA. The opposing flanks ZA of the two corresponding adjacent teeth Za can be separated by a tooth space ZI, the tooth space ZI including a curved or concave portion configured to contact or engage a link roller of the chain K. Each curved or concave portion of the tooth space ZI can have an osculating radius, or radius of curvature, Rs. The radius of curvature Rs of each side of the tooth space ZI facing a corresponding adjacent flank ZA, as for example, the left side tooth flank ZA and the right side tooth flank ZA, can be substantially equal in magnitude.

In accordance with the present invention, the known tooth flank ZA that can interact in the direction of rotation D with the link roller GR of the chain K for purposes of torque transmission can be replaced by a bevel S. The bevel S can enter substantially tangentially into the osculating radius Rs, preferably tangentially, at a point of transition T. The connection of the location of the transition T with the starting point of the osculating radius Rs can form an angle W with a ray or straight line St. The ray or straight line St can begin essentially at the center of the sprocket A, so that the angle W can preferably be at least about 60 degrees, and can give the bevel S a direction so that it, the bevel S, can emerge or can end at the upper end of a tooth, designated the tooth head ZK, beyond the tooth center ZM.

The bevel S can be formed by a straight line or, in a possible alternative embodiment of the present invention, by a radius R. The radius R can preferably have at least the magnitude of four times a distance P between the link rollers GR (see FIG. 3). The tooth Za can have a height H, which height H preferably is not significantly modified by the introduction of the bevel S. The tooth flank ZA on the side of the tooth Za opposite the bevel S can remain unchanged.

Figure 4A:
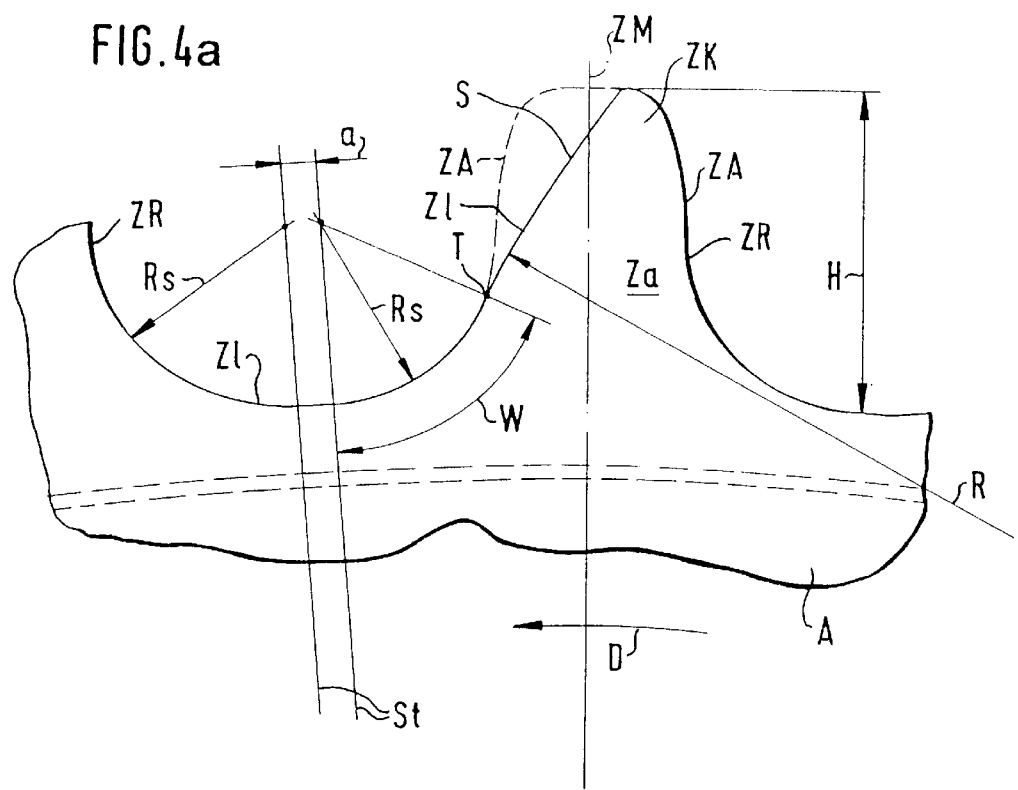
FIG. 4a is similar to FIG. 4 and includes additional reference characters.

In other words, the tooth Za of the sprocket A, as shown in the embodiment of FIG. 4a, can include a left hand flank portion ZL and a right hand flank portion ZR. The left hand flank portion ZL can precede its corresponding tooth Za in the direction of rotation D, and the right hand flank portion ZR can trail, or follow, its corresponding tooth Za in the direction of rotation D. As shown in FIG. 4a, the left hand flank portion ZL of one tooth Za and the adjacent right hand flank portion ZR of the adjacent tooth can be each adjacent and at opposite sides of the tooth space ZI between the corresponding teeth. Thus each tooth Za can have two flank portions ZL and ZR, located on opposite sides of the tooth Za. The flank portion ZL preceding, or in front of, the remaining portions of the tooth Za in the normal direction of rotation D of the sprocket A can be characterized as the drive flank ZL of the tooth Za, because the flank portion ZL can contact or engage the corresponding link roller GR of the chain K to transfer force between the sprocket A and the chain K. The flank portion ZR, following, or rearward of, the remaining portion of the tooth Za in the normal direction of rotation D of the sprocket A can be characterized as the nondriving, or idle flank ZR of the tooth Za, because the idle flank ZR preferably does not engage the corresponding link roller GR of the chain K to transmit force.

For the known tooth Za, each corresponding drive flank ZL and idle flank ZR of the known tooth Za can be realized as being substantially symmetrical with the corresponding opposite flank portion ZR, ZL about the centerline ZM of the tooth Za. This can be considered to be shown by the dashed lines of FIG. 4a, the dashed lines indicating the configuration of the drive flank ZL if the drive flank ZL were realized as being substantially symmetrical, with respect to the tooth centerline ZM, with the However, the present invention teaches, for a possible embodiment of the present invention, that the drive flank ZL can be realized in a configuration that preferably is not substantially symmetrical about the centerline ZM of the tooth Za with the non-driving, or idle flank ZR. As mentioned above, the drive flank ZL can include a bevel S (see FIG. 4). The bevel S preferably can be formed to be tangential with the adjacent radius of curvature Rs of the corresponding tooth space ZI at a point T as shown in FIG. 4. The point T can be disposed to form or define, for a possible embodiment of the present invention, the angle W between the corresponding radial centerline St of the adjacent radius of curvature Rs and the straight line defined by the radius of curvature Rs passing through the point T. The angle W can preferably be approximately 60 degrees or greater for some possible embodiments of the present invention.

Figure 4B:
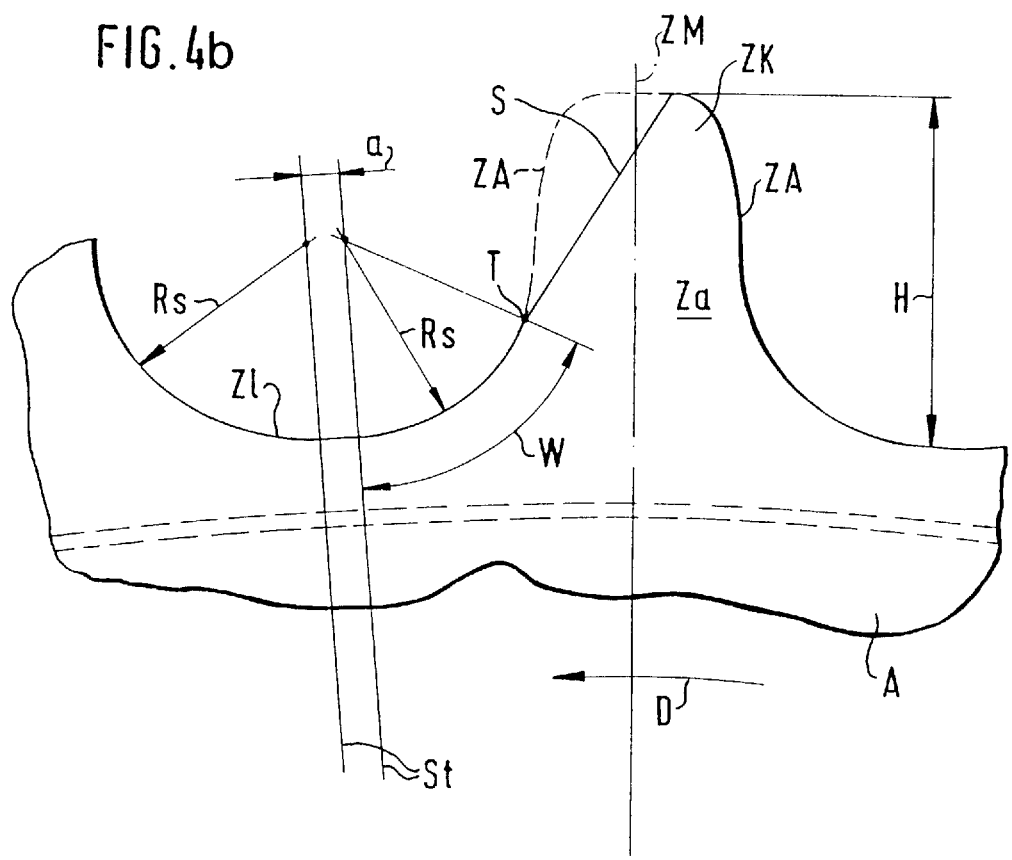
FIG. 4b illustrates an alternative shape of a tooth with the beveled driving tooth flank.

The bevel S can preferably be formed by a surface having a radius of curvature R as shown in FIG. 4, so that the bevel S can have a convex shape with respect to the remainder of the tooth Za. The radius of curvature R preferably can have a magnitude approximately 4 times the distance P between the link rollers GR, or greater for some possible embodiments of the present invention. Of course, as the radius of curvature R increases, the bevel S can be formed by a surface whose cross-section as shown in FIG. 4b substantially approaches a straight line (that is, surface approaches having an effective radius of curvature of infinity) and can form a substantially planar surface, and the bevel S can, for a possible embodiment of the present invention, be realized as a surface whose profile or cross-section can essentially form a straight line.

As shown in FIG. 4a, the known tooth Za can have a height H. The bevel S of the drive flank ZL can be configured, for possible embodiments of the present invention, to permit the tooth Za to have the height H substantially equal to or substantially approximating the height H of the corresponding known tooth Za. The bevel S of the drive flank ZL can be configured, for possible embodiments of the present invention, to permit the non-driven, or idle flank ZR to be configured in the known manner.

If a brand new, or essentially unworn, chain K, in which chain K the link rollers GR are preferably separated from one another by a distance P, then runs on the sprocket A, this distance P can be essentially equal to the distance between the tooth spaces ZI. As a result of the distance P being effectively equal to the distance between the tooth spaces ZI, even when a force is applied there can be essentially no reason for any displacement of the link rollers GR in the tooth spaces ZI.

But, as the chain K becomes worn, the distance P between the link rollers GR can change to an increased distance Pv as shown in FIG. 5. As a result of the increased distance Pv, the distances between the tooth spaces ZI can no longer essentially coincide with the increased distance Pv between the link rollers GR. When a force is applied substantially in the direction of rotation D, the link rollers GR of the chain K can be raised on the inclined plane of the bevel S, from or because of the contact of the link rollers GR with the osculating radius Rs, by a height difference h, whereby preferably the greater the distance Pv, the greater the height difference h.

In other words, as the chain K becomes worn, the chain K can elongate or become longer with wear as the distance P between the link rollers GR increased with wear to an increased distance Pv (for purposes of discussion it can be assumed that the distance Pv can be the same between each link roller GR, although it should be understood the increased distance Pv with respect to P need not be equal, nor necessarily occur, between each and every adjoining pair of link rollers GR). The wear deformation of the chain K, i.e. the increased distance from P to Pv, can increase the overall length of the chain K, and can increase the overall length of that portion of the chain K that was active in receiving a force from the sprocket A. With the known teeth, the increase in length of the chain K from wear can prevent some of the link rollers GR from otherwise snugly fitting into the corresponding tooth space ZI, and can prevent the corresponding adjacent drive flanks ZL from participating in the transfer of torque from the bicyclist to the chain K.

The present invention teaches that, for possible embodiments of the present invention, the elongation of the chain K caused by wear can be substantially compensated for by the bevel S of the drive flank ZL. The bevel S can act as an inclined ramp, and can permit each link roller GR to displace a radial distance h to engage the drive flank ZL with wear of the chain K. The radial displacement h with respect to the drive flank ZL can effectively increase the diameter at which the sprocket A can engage the link rollers GR, and can consequently effectively increase the length of the circumferential portion of the sprocket A that engages the chain K. The radial displacement h of each link roller GR of the chain K with respect to the drive flank ZL can thereby allow the sprocket A to automatically compensate for the increased length of the chain K with wear.

The wear compensation accomplished by the bevel S can permit the driving flank portion ZL to continue to transfer torque between the bicyclist and the corresponding link roller GR of the chain K, and can thereby permit more of the teeth Za to participate in the transfer of torque as the chain K wears than with the known teeth Za. The bevel S can be viewed, for other possible embodiments of the present invention, as a wear compensation device to compensate for the increased length of the chain K with wear of the components of the chain K. The wear compensation can be accomplished by increasing the effective engaged diameter of the chain K with the sprocket A, to permit continued participation of more teeth Za of the sprocket A in the transfer of torque to the chain K than could otherwise occur if wear compensation had not been provided.

Figure 3:
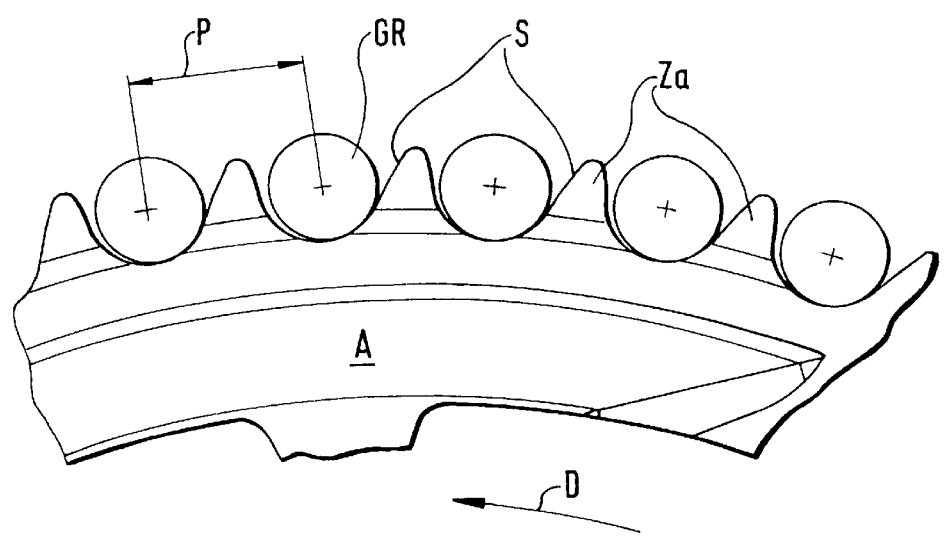
FIG. 3 shows a sprocket with drive rollers of the chain, in which the distance between the rollers, or chain pitch, coincides with the pitch of the teeth of the sprocket.

FIGS. 3 and 5 therefore can illustrate the difference between the operation of a new chain K on the sprocket A and a relatively severely worn chain K on this same sprocket A, although both combinations, the new chain K or the relatively severely worn chain K, especially in the entry or run in area E of the chain K, can transmit the torque to the sprocket A by means of a plurality of teeth Za. As an additional advantage of the interaction of the teeth Za and Zb, which teeth Za and Zb have been modified on the corresponding driving tooth flank ZA and ZB, there can be a greater probability of a clean or smooth chain transition at points which were not originally provided for the chain transfer. In such a case, the link roller GR can come into contact with the bevel S of the tooth Za or Zb as early as relatively quite close to the tooth head ZK, where there can be already more favorable driving conditions for the link roller GR than when the contact is initially made between the conventional tooth flank ZA with its radius in the vicinity of the tooth head ZK. There can also be a greater probability that the remaining narrower tooth head ZK will be able to get between two link rollers GR than with conventionally shaped teeth.

In other words, as shown in FIG. 5a, when the tooth Za is driven in the direction of rotation D to transmit torque from the bicyclist to the worn chain K, the left hand flank portion ZL can engage or contact the corresponding link roller GR of the worn chain K to transmit torque between the sprocket A and the worn chain K. The left hand flank portion ZL can be configured to contact the chain K to transmit torque when the chain K is worn. The left hand flank portion ZL can include a bevel S configured to compensate for the increasing length of the chain K with wear.

As tests have confirmed, there can also be an improvement of the "chain jamming phenomenon" which is observed in similar known devices. This improvement can be explained by noting that in the entry area of the respectively larger sprocket A, the chain K, which chain K can be raised by the height difference h, can be more relatively easily released from its connection with the sprocket A in question. Additional advantages can lie in the favorable wear configuration of the driving tooth flank with the bevel S, so that the teeth Za preferably no longer run in or extend on their driving tooth flanks ZA in or into an extension of the osculating radius Rs, but that the wear zone preferably extends along the bevel S over a larger area, which larger area also preferably has a reduced depth. It can be readily apparent that the "chain jamming phenomenon" can be exacerbated if the conventional tooth flank ZA can be modified by wear such that a sort of undercutting of the corresponding tooth Za can occur.

In other possible embodiments of the present invention, the profile of the bevel S can be formed other than by a straight line or the radius R as described above. For example, testing with chains having different states of wear could experimentally determine that some other bevel profile, as for example a bevel having a non-constant radius of curvature could be used for a particular chain/sprocket combination. Or the chain/sprocket system could be mathematically modelled, with the bevel profile satisfying some relatively more complex mathematical function or disposed to substantially form a curve through a number of discrete points calculated along the profile. The bevel can compensate for the wear of the chain, and the bevel can have a profile or shape that can be chosen or determined to essentially optimize the compensation for the wear of the chain throughout the working life of the chain.

In yet other possible embodiments of the present invention, the teeth Za that are made in accordance with the present invention can be made symmetrical about the radial centerline ZM of each tooth Za. The drive flank ZL of each such tooth can have a bevel S in accordance with the teachings of the present invention, but the idle flank ZR can be made symmetrical, or substantially symmetrical, with the drive flank ZL of the tooth Za with respect to the radial centerline ZM of the tooth Za.

One feature of the invention resides broadly in the bicycle power train or derailleur comprising a driving or front sprocket set KS and a driven or rear sprocket set KH, as well as a chain K which connects these two sprocket sets KS and KH to one another, which chain has chain links KG consisting of link rollers GR and side plates L, whereby the sprocket set KS also comprises at least two sprockets A, B, . . . whereby to shift or transfer the chain K to another sprocket A, B of the sprocket set KS, a derailleur U in an inlet area E of the chain K, can impart movements in a direction parallel to the pedal axis PM of the sprocket set KS, and whereby the sprockets A, B of the sprocket set KS each have a plurality of teeth Za, Zb, . . . which are connected to one another by tooth spaces ZI with osculating radii or radii of curvature Rs, characterized by the fact that a maximum of all the teeth Za, Zb, viewed axially on the sprockets A, B, have an asymmetrical shape as a result of a bevel S, whereby one tooth flank ZA of the teeth Za and one tooth flank ZB of the teeth Zb are replaced by the bevel S, on the side which, when the sprockets A, B are driven by the bicycle rider, enters into a driving contact with the link rollers G of the chain K.

Another feature of the invention resides broadly in the bicycle power train characterized by the fact that the bevel S, as a tangent to the osculating radius Rs, represents a connection between this osculating radius Rs and the tooth head ZK, whereby at least one-half of the tooth head ZK is omitted.

Yet another feature of the invention resides broadly in the bicycle power train characterized by the fact that the bevel S is a straight line.

Still another feature of the invention resides broadly in the bicycle power train characterized by the fact that the bevel S describes a radius R which has a magnitude which is at least four times the distance P between two neighboring link rollers GR and imparts a convex shape to the bevel S.

A further feature of the invention resides broadly in the bicycle power train characterized by the fact that the osculating radius Rs remains constant over a curve which corresponds to an angle W of at least 60 degrees up to a point T of its transition into the tangentially approaching bevel S, that is, to the bevel S being tangential with at the transition point T.

Some examples of bicycle power trains that could be adapted for use in the context of the present invention, and components that can generally be included in bicycle power trains and other components that can generally be included in bicycles could be disclosed by the following U.S. patents, all of which U.S. patents are assigned to the assignee of the present invention and are herein incorporated by reference as if fully set forth: U.S. Pat. Nos. 5,588,925, 5,556,354, 5,540,456, 5,538,270, 5,527,230, 5,522,611, 5,503,598, 5,464,239 and 5,443,279.

Other examples of bicycle power trains that could be adapted for use in the context of the present invention, and components that can generally be included in bicycle power trains and other components that can generally be included in bicycles could be disclosed by the following U.S. patent applications, all of which U.S. patent applications are assigned to the assignee of the present invention and are herein incorporated by reference as if fully set forth: Ser. Nos. 08/688,834, 08/653,955, 08/610,665, 08/610,657, 08/610,651, 08/610,620, 08/577,626, 08/566,284 and 08/535,624.

Yet other examples of bicycle power trains that could be adapted for use in the context of the present invention, and components that can generally be included in bicycle power trains and other components that can generally be included in bicycles could be disclosed by the following U.S. patents: U.S. Pat. Nos. 5,273,495, 5,195,766, 5,133,695, 5,062,318, 4,988,328 and 4,966,380.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 196 06 667.0, filed on Feb. 23, 1996, having inventors Frank Schmidt, Holger Brandt, Markus Krumbeck, and Andreas Neuer, and DE-OS 196 06 667.0 and are hereby incorporated by reference as set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A bicycle, said bicycle comprising:

a frame;

a front wheel being operatively connected to said frame;

a rear wheel being operatively connected to said frame;

a steering arrangement being operatively connected to said frame;

a front multi-sprocket set being operatively connected to said frame;

said front multi-sprocket set being configured and disposed to receive a force from a pedal and transfer a force to a sprocket chain;

said front multi-sprocket set comprising a plurality of sprockets;

a sprocket chain;

a front derailleur being operatively connected to said frame;

said front derailleur being disposed to shift said sprocket chain from one of said plurality of sprockets to another one of said plurality of sprockets of said front multi-sprocket set;

a rear multi-sprocket set being operatively connected to said frame;

said rear multi-sprocket set being disposed to receive a force from said sprocket chain and to transfer a force to a wheel hub of said rear wheel;

said sprocket chain being configured and disposed to transfer a force from said front multi-sprocket set to said rear multi-sprocket set; and each of said plurality of sprockets of said front multi-sprocket set comprising:

means for being attached to a pedal;

a plurality of teeth being disposed to receive a force from a pedal and to transfer a force to said sprocket chain;

at least one tooth of said plurality of teeth is disposed to contact said sprocket chain to transfer a force from a pedal to said sprocket chain; and said at least one tooth having a flank configured to compensate for an increased length of said sprocket chain caused by wear of components of said sprocket chain.

2. The bicycle according to claim 1, wherein said flank of each of said plurality of sprockets of said front multi-sprocket set is disposed to contact said sprocket chain to transfer a force from a pedal to said sprocket chain.

3. The bicycle according to claim 2, wherein said flank of each of said plurality of sprockets of said front multi-sprocket set comprises a bevel.

4. The bicycle according to claim 3, wherein:

said bevel is configured and disposed to provide said at least one tooth with a substantially asymmetric shape;

said sprocket chain comprises a plurality of link rollers; and said flank of said at least one tooth of each of said plurality of sprockets of said front multi-sprocket set is disposed to contact one of said link rollers of said plurality of link rollers of said sprocket chain.

5. The bicycle according to claim 4, wherein:

said bevel of said flank of said at least one tooth of each of said plurality of teeth of said sprockets of said front multi-sprocket set extends along the entire extent of said flank.

6. The bicycle according to claim 5, wherein:

each sprocket of said front multi-sprocket set is disposed to rotate about a common axis of rotation;

said bevel of said flank of said at least one tooth of each of said plurality of sprockets of said front multi-sprocket set comprises one of the following A) and B):

A) said bevel is substantially planar; and

B) said bevel has an axial thickness extending substantially parallel to the axis of rotation;

said bevel has a convex shape with respect to the remainder of the corresponding one of said at least one tooth; and said convex shape of said bevel comprises a circular portion extending the thickness of said bevel.

7. The bicycle according to claim 6, wherein each sprocket of said front multi-sprocket set comprises:

a portion defining a tooth-space;

said portion is disposed to extend in a circumferential direction away from said bevel of said flank of said at least one tooth to an adjacent tooth of said plurality of teeth;

said portion comprises a concave portion;

said concave portion of said portion is disposed adjacent said bevel of said flank;

said concave portion of said portion is disposed to contact a link roller of said plurality of link rollers of said sprocket chain when said sprocket chain is substantially unworn;

said concave portion of said portion comprises a surface;

said bevel comprises a surface; and said surface of said concave portion and said surface of said bevel are disposed to intersect substantially tangentially with respect to one another.

8. The bicycle according to claim 7, wherein:

said concave portion has an axial thickness extending substantially parallel to the axis of rotation;

said surface of said concave portion defines a substantially circular arc;

the substantially circular arc extends along the thickness of said concave portion;

the substantially circular arc has a centerline extending along the thickness of said concave portion;

the radius of the substantially circular arc from the centerline represents the radius of curvature of said surface of said concave portion;

said surface of said concave portion comprises a first side and a second side;

said first side of said surface is disposed adjacent said surface of said bevel;

said first and second sides of said surface are spaced apart from one another in a circumferential direction about the axis of rotation;

said first side of said surface defines a first line substantially parallel to the axis of rotation;

said second side of said surface defines a second line substantially parallel to the axis of rotation;

the second line, the centerline, and the axis of rotation each lie in a first plane;

the centerline and the first side of said surface define a second plane intersecting the first plane;

the intersection of said first and second planes defines an angle;

the angle has a vertex along the centerline and encloses said surface portion of said concave portion; and the angle is no less than sixty degrees.

9. The bicycle according to claim 8, wherein:

a distance between adjacent link rollers of said sprocket chain when said sprocket chain is unworn represents the pitch of said sprocket chain;

said bevel of said flank of said at least one tooth comprises item B);

the magnitude of the radius of said circular portion of said bevel is not less than four times the chain pitch of said sprocket chain;

said flank of said at least one tooth represents a first flank;

said at least one tooth comprises a second flank;

said second flank is disposed on an opposite side of said at least one tooth from said first flank;

said at least one tooth comprises a first portion and a second portion;

said first portion of said at least one tooth extends from said first flank in a circumferential direction about the axis of rotation to a side of said first portion;

said second portion of said at least one tooth extends from said side of said first portion in a circumferential direction about the axis of rotation to said second flank of said at least one tooth;

said side of said first portion of said at least one tooth is disposed to define a third plane;

the third plane extends through the axis of rotation and is parallel with the axis of rotation; and each of said first and second sides of said at least one tooth is configured to be substantially asymmetric with respect to the other of said first and second sides of said at least one tooth about the third plane.

10. A front sprocket for a manually-powered bicycle having a frame, a front wheel being operatively connected to the frame, a rear wheel being operatively connected to the frame, a steering arrangement being operatively connected to the frame, a rear multi-sprocket set being operatively connected to the frame, at least one pedal and a sprocket chain for providing a force to be transferred from the at least one pedal, said sprocket comprising:

means for connecting said sprocket with a pedal;

a plurality of teeth being configured and disposed to receive a force from a pedal and to transfer a force to a sprocket chain;

at least one tooth of said plurality of teeth being configured and disposed to contact a sprocket chain to transfer a force from a pedal to a sprocket chain; and said at least one tooth having a flank being configured and disposed to compensate for an increased length of a sprocket chain contacting said at least one tooth caused by wear of components of a sprocket chain contacting said at least one tooth.

11. The sprocket according to claim 10, wherein said flank of said at least one tooth is configured to contact a sprocket chain to transfer a force from a pedal to a sprocket chain.

12. The sprocket according to claim 11, wherein:

said flank comprises a bevel; and said bevel of said flank is configured and disposed to provide said at least one tooth with a substantially asymmetric shape.

13. The sprocket according to claim 12, wherein;

each of said plurality of teeth comprises said flank;

said flank of each of said plurality of teeth comprises said bevel; and said bevel of said flank of each of said plurality of teeth is configured to contact a link roller of a sprocket chain.

14. The sprocket according to claim 13, wherein said bevel comprises the entirety of said flank of each of said plurality of teeth.

15. The sprocket according to claim 14, wherein:

said sprocket is configured to rotate about an axis of rotation;

said sprocket comprises a portion defining a tooth-space;

said portion is disposed to extend in a circumferential direction about the axis of rotation from said bevel of said flank to an adjacent tooth of said plurality of teeth;

said portion comprises a concave portion;

said concave portion of said portion is disposed adjacent said bevel of said flank;

said concave portion of said portion is configured to contact a link roller of a substantially unworn chain to transfer a force from a pedal to a sprocket chain;

said concave portion of said portion comprises a surface;

said bevel of said flank comprises a surface; and said surface of said concave portion and said surface of said flank are disposed to meet substantially tangentially with respect to one another.

16. The sprocket according to claim 15, wherein:

said concave portion has a thickness extending substantially parallel to the axis of rotation;

said surface of said concave portion defines a substantially circular arc;

the substantially circular arc extends substantially along the thickness of said concave portion;

the substantially circular arc has a centerline extending substantially parallel to the axis of rotation;

the radius of the substantially circular arc from the centerline represents the radius of curvature of said surface of said concave portion;

said surface of said concave portion comprises a first side and a second side;

said first side of said surface is disposed adjacent said surface of said bevel;

said first and second sides of said surface are spaced apart from one another in a circumferential direction about the axis of rotation;

said first side of said surface defines a first line extending the thickness of said concave portion substantially parallel to the axis of rotation;

said second side of said surface defines a second line extending the thickness of said concave portion substantially parallel to the axis of rotation;

the second line, the centerline, and the axis of rotation each lie in a first plane;

the centerline and the first side of said surface define a second plane intersecting the first plane;

the intersection of said first and second planes defines an angle;

the angle has a vertex along the centerline and encloses said surface portion of said concave portion; and the angle is no less than sixty degrees.

17. The sprocket according to claim 16, wherein said bevel of each of said plurality of teeth comprises one of the items A) and B):

A) said surface of said bevel of each of said plurality of teeth is substantially planar; and B) said bevel has an axial thickness extending substantially parallel to the axis of rotation;

said bevel has a convex shape with respect to the remainder of each of said plurality of teeth;

said surface of said bevel is a convex surface;

said convex surface of said bevel is disposed to define a portion of a circle extending the thickness of said bevel; and the radius of the portion of the circle represents the radius of curvature of said convex surface of said bevel.

18. The sprocket according to claim 17, the distance between adjacent link rollers of the unworn chain representing the pitch of the chain, wherein:

said bevel comprises item B);

the magnitude of the radius of curvature of said convex surface of said bevel is configured to be not less than four times the chain pitch of a chain contacting said bevel.

19. The sprocket according to claim 18, wherein:

said flank of each of said plurality of teeth represents a first flank;

each of said plurality of teeth comprises a second flank;

said second flank is disposed on an opposite side of each of said plurality of teeth from said first flank;

each of said plurality of teeth comprises a first portion and a second portion;

said first portion of each of said plurality of teeth extends from said first flank in a circumferential direction about the axis of rotation to a side of said first portion;

said second portion of each of said plurality of teeth extends from said side of said first portion in a circumferential direction about the axis of rotation to said second flank of each of said plurality of teeth;

said side of said first portion of each of said plurality of teeth is disposed to define a third plane;

the third plane extends through the axis of rotation and is parallel with the axis of rotation; and each of said first and second sides of each of said plurality of teeth is configured to be substantially asymmetric with respect to the other of said first and second sides of each of said plurality of teeth about the third plane.

20. The sprocket according to claim 19, wherein:

said sprocket is configured to be a sprocket of a plurality of sprockets for a front multiple-sprocket set of a bicycle.

* * * * *

UNITED STATES PATENT AND TRADEMARK OFFICE
CERTIFICATE OF CORRECTION

```
PATENT NO.   :  5,830,096
DATED        :  November 3, 1998
INVENTOR(S)  :  Frank SCHMIDT, Holger BRANDT, Markus KRUMBECK,
                and Andreas NEUER
```

It is certified that error appears in the above-identified patent and that said Letters Patent is hereby corrected as shown below:

```
     In column 6, line 24, after 'the' insert
--idle flank ZR.--.

In column 10, line 34, after 'and' insert
--DE-PS 196 06 667.0,--.
```

Signed and Sealed this

Tenth Day of August, 1999

Attest:

Q. TODD DICKINSON

*Attesting Officer*　　*Acting Commissioner of Patents and Trademarks*